(12) United States Patent
Thresher

(10) Patent No.: US 10,926,364 B2
(45) Date of Patent: Feb. 23, 2021

(54) PLATE-FIN HEAT EXCHANGER CORE DESIGN FOR IMPROVED MANUFACTURING

(71) Applicant: Hamilton Sundstrand Corporation, Charlotte, NC (US)

(72) Inventor: Wayne A. Thresher, Wilbraham, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 5 days.

(21) Appl. No.: 16/150,846

(22) Filed: Oct. 3, 2018

(65) Prior Publication Data
US 2020/0108474 A1   Apr. 9, 2020

(51) Int. Cl.
| | | |
|---|---|---|
| *B23P 15/26* | (2006.01) | |
| *B23H 1/00* | (2006.01) | |
| *F28F 3/02* | (2006.01) | |
| *F28F 3/08* | (2006.01) | |
| *F28F 9/26* | (2006.01) | |

(52) U.S. Cl.
CPC ............... *B23P 15/26* (2013.01); *B23H 1/00* (2013.01); *F28F 3/025* (2013.01); *F28F 3/08* (2013.01); *F28F 9/268* (2013.01); *F28F 2275/04* (2013.01); *F28F 2275/06* (2013.01)

(58) Field of Classification Search
CPC ..... F28D 9/0025; F28D 9/0062; B29C 64/40; F28F 9/001; F28F 3/025; F28F 3/08; F28F 9/268; F28F 2275/04; F28F 2275/06; B23P 15/26; B23H 1/00
See application file for complete search history.

(56) References Cited

U.S. PATENT DOCUMENTS

| | | |
|---|---|---|
| 3,241,607 A | 3/1966 | Rutledge |
| 4,301,863 A | 11/1981 | Bizzarro |
| 4,516,632 A | 5/1985 | Swift et al. |

(Continued)

FOREIGN PATENT DOCUMENTS

| | | |
|---|---|---|
| EP | 3410054 A1 | 12/2018 |
| JP | 2015078795 A | 4/2015 |

OTHER PUBLICATIONS

English translation of JPH03230096 (Year: 1991).*

(Continued)

*Primary Examiner* — Jun S Yoo
(74) *Attorney, Agent, or Firm* — Kinney & Lange, P.A.

(57) ABSTRACT

A method for producing a plate-fin heat exchanger core includes the steps of stacking a bottom end sheet, multiple alternately stacked individual hot and cold layers, and a top end sheet, each of the individual hot and cold layers including a fin element forming multiple parallel open-ended fluid channels, a parting sheet separating the various individual layers, and two closure bars positioned on opposite sides of the fin element, parallel to the open-ended channels and extending a length of the open-ended channels, brazing the bottom end sheet, the various layers, and the top end sheet in a brazing furnace; and removing material from each of the exterior faces by precision machining, thereby removing material from each closure bar outer face. The precision machining can include electrical discharge machining, laser cutting, band sawing, drilling, boring, hogging, acid etching, and ion milling, in any combination.

11 Claims, 6 Drawing Sheets

(56) References Cited

U.S. PATENT DOCUMENTS

| | | | |
|---|---|---|---|
| 6,267,176 B1 | 7/2001 | Bolla et al. | |
| 6,520,252 B1* | 2/2003 | Bizzarro | F28D 9/0062 |
| | | | 165/166 |
| 7,972,198 B2 | 7/2011 | Noishiki et al. | |
| 9,976,815 B1 | 5/2018 | Roper et al. | |
| 2012/0090354 A1 | 4/2012 | Crayssac et al. | |
| 2014/0000841 A1 | 1/2014 | Baker et al. | |
| 2016/0129670 A1* | 5/2016 | Mochizuki | H05K 5/03 |
| | | | 361/679.01 |
| 2017/0198988 A1 | 7/2017 | Herring | |

OTHER PUBLICATIONS

Extended European Search Report dated Feb. 12, 2020, for corresponding European Application No. 19201074.2, 10 pages.

E.I. Gregory, "Plate Fin Heat Exchangers," from http://www.thermopedia.com/content/1036/, 6 pages.

"Plate fin heat exchanger," from https://en.wikipedia.org/w/index.php?title=Plate_fin_heat_exchanger&oldid=84921356"7, 2 pages.

Office Action dated Dec. 2, 2020, received for corresponding U.S. Appl. No. 16/371,392, 11 pages.

* cited by examiner

PLATE-FIN HEAT EXCHANGER CORE DESIGN FOR IMPROVED MANUFACTURING

BACKGROUND

The present disclosure relates to heat exchangers, and more particularly, to a plate-fin heat exchanger core design that improves the manufacturability and robustness of the plate-fin heat exchanger.

Plate-fin heat exchangers are well known in the aviation arts and in other industries for providing a compact, low-weight, and highly-effective means of exchanging heat from a hot fluid to a cold fluid. A plate-fin heat exchanger core of the prior art is typically constructed by individually stacking alternating layers of hot and cold fluid fins, applying closure bars to separate the hot fluid circuit from the cold fluid circuit, and then brazing the assembly. A metal or metal alloy can typically be used as the material for the heat exchanger core. After the plate-fin heat exchanger core is constructed, hot and cold inlet and outlet manifolds are typically welded to the respective ends of the hot and cold fluid circuits. Because the inlet and outlet manifolds are being welded to relatively thin metallic components, the adjacent regions of the heat exchanger core are subject to damage from the welding process. In some cases, the damage can be immediate and can be detected by testing and inspection. In other cases, the damage is latent, affecting the material integrity of the heat exchanger. In these situations, the latent damage can become apparent early in the life of the heat exchanger whereby operational cycles can lead to premature material failure, which can occur prior to the end of the expected lifetime of the heat exchanger. Accordingly, there is a need for an improved plate-fin heat exchanger core design that lends itself to manufacturability while also providing a more robust design that is better able to withstand the subsequent attachment of inlet and outlet manifolds by subsequent welding.

SUMMARY

A method is provided for producing a heat exchanger core defining a number of exterior faces and an interior region includes the steps of stacking a bottom end sheet, a number of alternately stacked individual hot and cold layers, and a top end sheet; brazing the bottom end sheet, the number of alternately stacked individual hot and cold layers, and the top end sheet in a brazing furnace; and removing material from each of the plurality of exterior faces by precision machining, thereby removing material from each closure bar outer face to produce a final closure bar width. Each of the individual hot and cold layers includes a fin element forming a number of parallel open-ended channels adapted to pass a fluid therethrough; a parting sheet separating the individual hot and cold layers from the next individual hot and cold layers; and two closure bars positioned on opposite sides of the fin element, parallel to the open-ended channels and extending a length of the open-ended channels. Each closure bar has an original closure bar width and a closure bar height, where the original closure bar width is at least as great as the closure bar height. Each closure bar defines an inner face and an outer face, where the inner face is directed toward the fin element and the outer face directed away from the fin element. The open-ended channels of the individual hot layers are parallel to each other, and the open-ended channels of the individual cold layers are parallel to each other.

A heat exchanger core defines a number of exterior faces and an interior region including a bottom end sheet, a number of alternately stacked individual hot and cold layers, and a top end sheet. Each individual hot and cold layer includes a fin element forming a number of parallel open-ended channels adapted to pass a fluid therethrough, a parting sheet separating each individual hot or cold layer from the next individual hot or cold layer, and two closure bars positioned on opposite sides of the fin element, the inner face directed toward the fin element and the outer face directed away from the fin element, parallel to the open-ended channels and extending the length of the open-ended channels. Each closure bar has two vertical core band sections on each outer face defining an original closure bar width, the original closure bar width being greater than the closure bar height; and each closure bar defines an inner face and an outer face, the inner face directed toward the fin element and the outer face opposite from the inner face.

DETAILED DESCRIPTION

The present disclosure provides a plate-fin heat exchanger core design that improves manufacturability of the heat exchanger core while also providing a robust design that improves the ability of the heat exchanger core to withstand the heat and temperature of the subsequent welding of the inlet and outlet manifolds to the heat exchanger core. As used in this disclosure, the robust plate-fin heat exchanger core will be referred to as a heat exchanger core. This disclosure is directed to a heat exchanger core, while recognizing that a functioning heat exchanger could generally include inlet and outlet manifolds to complete the respective hot and cold circuits. Because a heat exchanger transfers heat from one fluid to another while maintaining a fluid separation between the two, heat will generally flow from the hot fluid to the cold fluid across the various components in the heat exchanger. Therefore, as used in this disclosure, "hot" will be used to describe the first fluid circuit and "cold" will be used to describe the second fluid circuit. The terms "hot" and "cold" are relative one to the other. As used in different embodiments, the heat exchanger core can encounter temperatures ranging from near absolute zero (for example, in cryogenic distillation) to 1,000 deg. F (538 deg. C) or more (for example, in gas turbine engine systems and related components). Moreover, "hot" and "cold" are used in this disclosure as descriptive terms to refer to the various components that are associated with the respective first and second fluid circuits in the heat exchanger core, without implying that particular temperatures or a temperature relationship exists for those components during the manufacturing process of the heat exchanger core.

Figure 1:
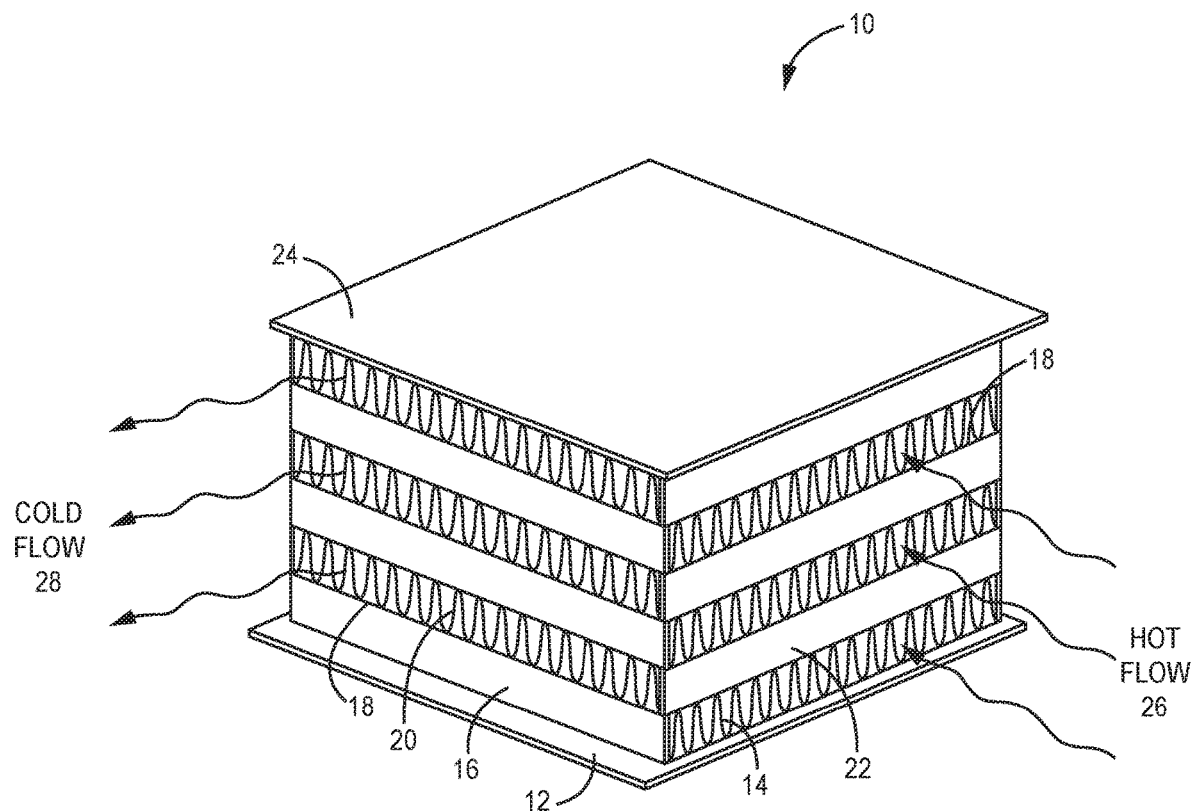
FIG. 1 is a perspective view of a plate-fin heat exchanger core of the prior art.

FIG. 1 is a perspective view of a plate-fin heat exchanger core of the prior art. Shown in FIG. 1 are heat exchanger core 10, bottom end sheet 12, hot fins 14, hot closure bars 16, parting sheets 18, cold fins 20, cold closure bars 22, top end sheet 24, hot flow 26, and cold flow 28. Alternating hot and cold layers are sandwiched between bottom end sheet 12 and top end sheet 24. Hot fins 14 channel hot flow 26, with boundaries defined by hot closure bars 16 on either side of each hot layer, and parting sheets 18 on the top and bottom of each layer. Similarly, cold fins 20 channel cold flow 28, with boundaries defined by cold closure bars 22 on either side of each cold layer, and parting sheets 18 on the top and bottom of each layer. In the illustrated embodiment, hot fins 14 and cold fins 20 are corrugated, and three hot layers and three cold layers are used. In other embodiments, there can be practically any number of hot layers and cold layers, and the number of hot layers can be different from the number of cold layers. In referring to heat exchanger core 10 shown in FIG. 1, height will refer to a dimension in the vertical direction as shown in FIG. 1, and width will refer to a dimension in an orthogonal direction along an appropriate axis that is defined by either hot flow 26 or cold flow 28. Of course, after assembly into a heat exchanger (not shown), heat exchanger core 10 can have any physical orientation.

The term "heat exchanger core components" includes the collection of bottom end sheet 12, hot fins 14, hot closure bars 16, parting sheets 18, cold fins 20, cold closure bars 22, and top end sheet 24. The heat exchanger core components can refer to a stacked assembly of the aforementioned components, prior to being brazed together to create heat exchanger core 10. The heat exchanger core components can be made of metal or a metal alloy, thereby being conducive to metallurgical joining processes including brazing and welding. In a typical embodiment, inlet and outlet manifolds (not shown) are attached to heat exchanger core 10 to channel flow through the hot layers, and inlet and outlet manifolds (not shown) are attached to heat exchanger core 10 to channel flow through the respective layers. Additionally, the inlet and outlet manifolds can be made of metal or a metal alloy. In a typical embodiment, the inlet and manifolds can be attached to heat exchanger core 10 by welding.

Hot closure bars 16 and cold closure bars 22 typically have a height (not labeled) that is much greater than a width (not labeled). Accordingly, when stacking together the heat exchanger core components in preparation for the brazing operation that forms heat exchanger core 10, hot closure bars 16 and cold closure bars 22 are positioned on their edges, as shown in FIG. 1. Because of the relatively large height-to-width ratio of hot closure bars 16 and cold closure bars 22, it can be a precarious task to stack together the heat exchanger core components so that various hot closure bars 16 and/or cold closure bars 22 do not fall over or otherwise become misaligned. Therefore, the assembling of heat exchanger core 10 of the prior art can be a time-intensive process that can also require re-work in the event that components have become misaligned.

As noted above, welding can be used to metallurgically join the inlet and outlet manifolds to heat exchanger core 10, with welds occurring along heat exchanger core 10 in the regions where the various hot closure bars 16 and cold closure bars 22 define the vertical corners of heat exchanger core 10. Welding can subject the heat exchanger core components to extreme temperatures and/or cause temperature-induced material stress that can affect the integrity of those components. As noted earlier, parting sheets 18 form a fluid boundary between hot flow 26 and cold flow 28. Because it can be desirable for parting sheets 18 to be as thin as possible, parting sheets 18 can be particularly susceptible to damage during the welding process. As noted earlier, hot closure bars 16 and cold closure bars 22 can be relatively thin. The process of welding inlet and outlet manifolds to heat exchanger core 10 can similarly affect the integrity of hot fins 14, hot closure bars 16, cold fins 20, and/or cold closure bars 22.

Figure 2:
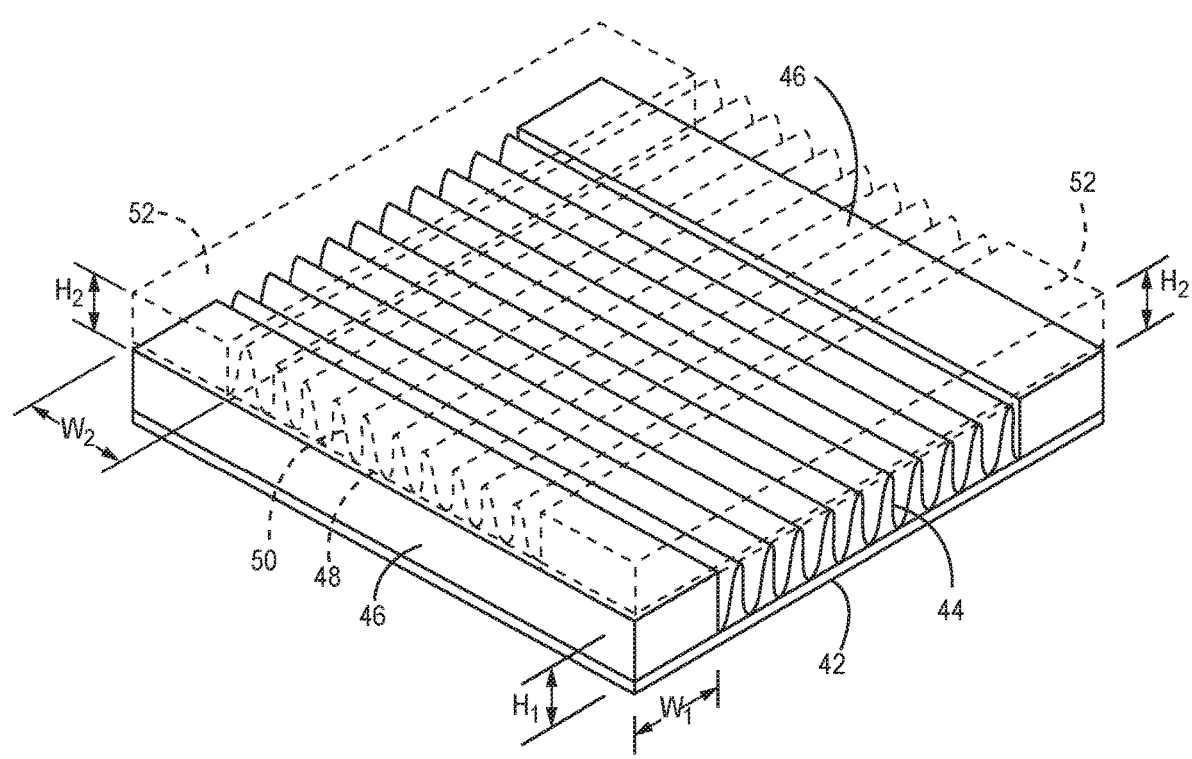
FIG. 2 is a perspective partially-transparent view of a hot and cold layer of the plate-fin heat exchanger core prior to precision material removal.

FIG. 2 is a perspective partially-transparent view of a hot and cold layer of the plate-fin heat exchanger core of an embodiment of the present disclosure prior to precision material removal. Shown in FIG. 2 are bottom end sheet 42, hot fin 44, hot closure bar 46, parting sheet 48, cold fin 50, and cold closure bar 52. Bottom end sheet 42 forms the base on which the first hot layer is stacked. Hot fin 44 is positioned on bottom end sheet 42, with hot closure bars 46 on either side. Hot closure bars 46 have hot closure bar height H1 and hot closure bar width W1. Hot fin 44 is a corrugated material. In the illustrated embodiment, hot closure bar width W1 is greater than hot closure bar height H1. Parting sheet 48 is on top of hot fin 44 and hot closure bars 46, thereby forming the first hot layer. Cold fin 50 is positioned on parting sheet 48, with cold closure bars 52 on either side. Cold fin 50 is a corrugated material. Each cold closure bar 52 has cold closure bar height H2 and cold closure bar width W2. In the illustrated embodiment, cold closure bar width W2 is greater than cold closure bar height H2. In a similar fashion, a second parting sheet 48 can be placed on top of cold fin 50 and cold closure bars 52, thereby forming the first cold layer. Subsequent hot and cold layers can be stacked together, then capped with a top end sheet (not shown) to construct a heat exchanger core.

In the illustrated embodiment, hot closure bars 46 are approximately perpendicular to cold closure bars 50, typical of a cross-flow heat exchanger configuration as depicted herein. Hot closure bar height H1 is shown to be roughly equal to cold closure bar height H2 for convenience of illustration. In other embodiments, hot closure bars 46 and cold closure bars 50 can have any orientation, and/or hot closure bar height H1 can be greater than or less than cold closure bar height H2. In the illustrated embodiment, hot fins 44 and cold fins 50 are shown to be corrugated. In other embodiments, hot fins 44 and/or cold fins 50 can have any configuration, with non-limiting examples being rectangular, triangular, perforated, serrated, ruffled, and herringbone.

In an exemplary embodiment, hot closure bar height H1 and cold closure bar height H2 are both approximately 0.25 in. (6.4 mm), and hot closure bar width W1 and cold closure bar width W2 are both approximately 0.40 in. (10.2 mm). In some embodiments, hot closure bar height H1 can be greater than or less than 0.25 in. (6.4 mm), and cold closure bar height H2 can be greater than or less than 0.25 in. (6.4 mm). In other embodiments, hot closure bar height H1 and/or cold closure bar height H2 can be 1 in. (25.4 mm) or greater. In some of these other embodiments, hot closure bar height H1 and/or cold closure bar height H2 can be 2 in. (50.8 mm) or greater. In yet other embodiments, hot closure bar height H1 and/or cold closure bar height H2 can be 0.025 in. (0.64 mm) or less. Moreover, hot closure bar height H1 can be different from cold closure bar height H2. In other embodiments, hot closure bar height H1 can be approximately equal to hot closure bar width W1, and/or cold closure bar height H2 can be approximately equal to cold closure bar width W2. In these other embodiments, it can be advantageous for the width W1, W2 of a particular closure bar to be similar to or greater than its height H1, H2 to facilitate the stacking of the heat exchanger core components prior to brazing. For example, in an exemplary embodiment, hot closure bar height H1 can be approximately 0.10 in. (2.5 mm), cold closure bar height H2 can be approximately 0.25 in. (6.4 mm), and hot closure bar width W1 and cold closure bar width W2 can both be approximately 0.35 in. (8.9 mm).

Figure 3:
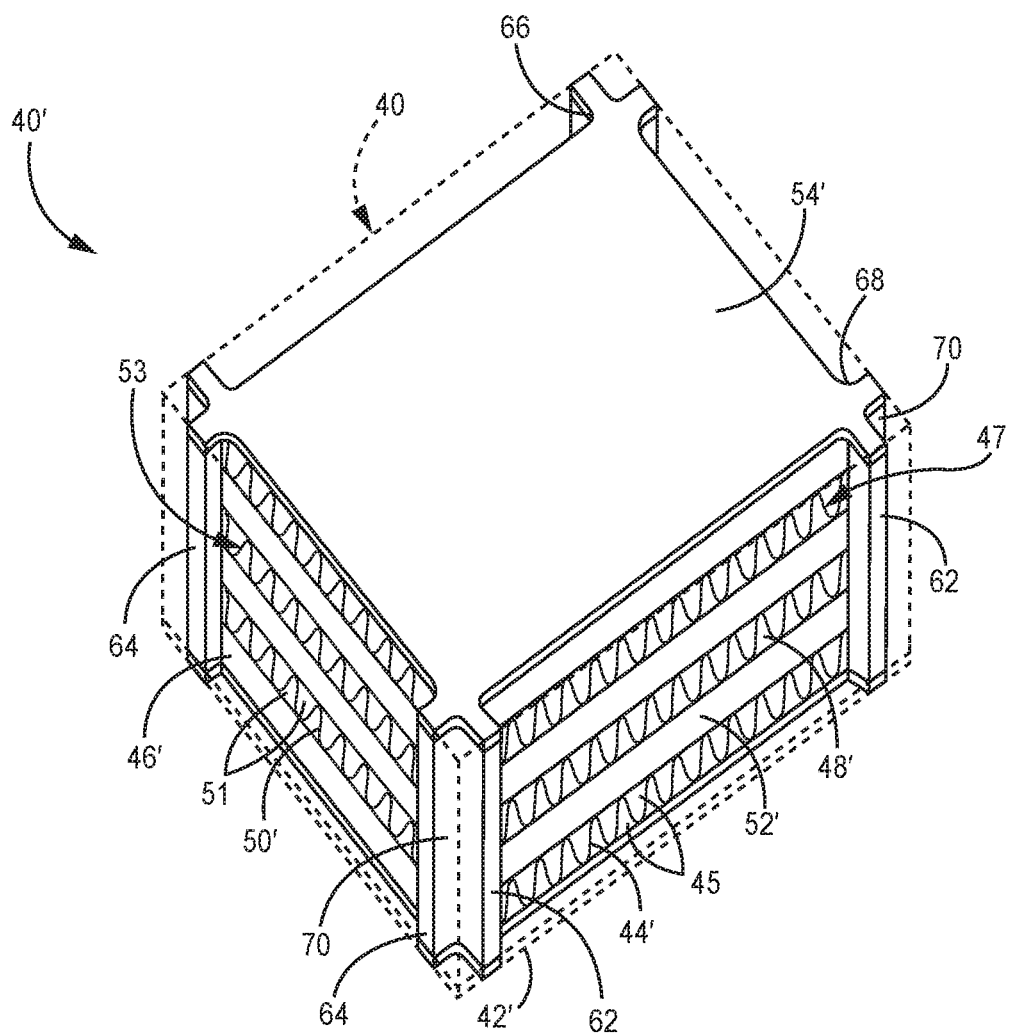
FIG. 3 is a perspective view of the plate-fin heat exchanger core showing the precision material removal regions.

FIG. 3 is a perspective view of heat exchanger core 40' showing the precision material removal regions. As used in this disclosure, heat exchanger core 40 is a brazed assembly prior to precision material removal, and heat exchanger core 40' results after precision material removal. As used in FIGS. 3-4, the prime mark will be used on an element to represent that particular element following precision material removal. Shown in FIG. 3 are heat exchanger core 40', bottom end sheet 42', hot fins 44', hot channels 45, hot closure bars 46', hot layers 47, parting sheets 48', cold fins 50', cold channels 51, cold closure bars 52', cold layers 53, hot core bands 62, cold core bands 64, hot core band radii 66, cold core band radii 68, and core band corner radii 70. Heat exchanger core 40' is formed by stacking alternating hot and cold layers as depicted in FIG. 2. The various components of heat exchanger core 40' are substantially as described in FIG. 2. In the illustrated embodiment, heat exchanger core 40' includes three hot layers 47 and three cold layers 53 alternating with each other, thereby resulting in multiple alternately-stacked individual hot and cold layers 47, 53. Top end sheet 54' caps the top-most layer to complete heat exchanger core 40'. In other embodiments, heat exchanger core 40' can include any number of hot layers 47 and/or cold layers 53, as described above with respect to FIG. 2. The total number of hot layers 47 can be different from the total number of cold layers 53. Moreover, the hot layers 47 and cold layers 53 can differ in height from each other. In the illustrated embodiment, heat exchanger core 40' can be generally described as having a box-like geometric configuration defining a top, a bottom, a front, a back, a left side, a right side, an interior region, and exterior faces. As used herein, the terms bottom and top describe heat exchanger core 40 with regard to the placement of bottom end sheet 42' and top end sheet 54', respectively, in the illustrated embodiment. Accordingly, front and back are opposite faces of heat exchanger core 40'. Similarly, left side and right side are opposite faces of heat exchanger core 40', each being approximately perpendicular to the front and back. These terms are used to help conceptualize heat exchanger core 40' in a particular embodiment, but they do not imply box-like appearance or the perpendicularity of faces in other embodiments. Moreover, bottom and top are used to describe the illustrated embodiment without inferring the orientation of heat exchanger core 40' when used in a heat exchanger with regard to gravity or an up/down orientation. In a particular embodiment, the front, back, left side, and right side can be referred to as external faces. In some embodiments, the external faces may have a geometric orientation that is other than box-like as described above.

Referring again to FIG. 3, during the manufacturing process, bottom end sheet 42' defines the bottom-most portion of heat exchanger core 40'. Alternating hot and cold layers 47, 53 are formed by the positioning of hot fins 44', hot closure bars 46', parting sheets 48', cold fins 50', and cold closure bars 52' as described earlier. Within a particular hot layer 47, hot fin 44' and parting sheets 48' create a number of parallel open-ended hot channels 45 through which a hot fluid can pass during the operation of heat exchanger core 40'. Similarly, within a particular cold layer 53, cold fin 50' and parting sheets 48' create a number of parallel open-ended cold channels 51 through which a cold fluid can pass during the operation of heat exchanger core 40' Top end sheet 54' provides the top-most portion of heat exchanger core 40'.

The various components of heat exchanger core 40' can be made of metal or a metal alloy. Non-limiting examples of metallic materials that can be used in heat exchanger core 40 include nickel, aluminum, titanium, copper, iron, cobalt, and all alloys that include these various metals. In a typical embodiment, some or all of bottom end sheet 42', hot fins 44', hot closure bars 46', parting sheets 48', cold fins 50', cold closure bars 52', and top end sheet 54' can be coated with a brazing material. Next, in an exemplary manufacturing process, the stacked heat exchanger core components are held in position by a brazing fixture and placed into a brazing furnace for the metallurgical joining together of the afore-listed components. Brazing furnaces are known to those who are skilled in the plate-fin heat exchanger arts. An exemplary brazing process can include evacuating the air from the brazing furnace so that the stacked heat exchanger core components are in a vacuum. Next, the temperature in the brazing furnace is increased to at least the brazing melt temperature and held for a period of time to allow the brazing material to melt. The brazing furnace temperature is then lowered, thereby allowing the brazing material to solidify, and the brazing furnace can be backfilled by an inert gas. An annealing cycle can also be performed in some embodiments.

After the heat exchanger core components are brazed, a precision material removal operation is performed to remove material from the various faces of heat exchanger core 40 (i.e., following brazing but prior to a precision material removal process) to produce heat exchanger core 40'. The phantom outline of heat exchanger core 40' in FIG. 3 depicts the outline of heat exchanger core 40 prior to precision material removal. The various features of heat exchanger core 40' (i.e., after precision material removal) will be described in greater detail in FIGS. 4-6. As used in this disclosure, precision material removal refers to a process by which material is removed from the various exterior-facing regions of heat exchanger core 40 (i.e., prior to precision material removal) to produce heat exchanger core 40' (i.e., after precision material removal). Precision material removal (also called precision machining) is known to those who are skilled in the metallurgical arts. Non-limiting examples of precision material removal processes include electrical discharge machining (EDM), laser cutting, band sawing, drilling, boring, hogging, acid etching, and ion milling, or any combination of these processes. Precision machining and precision material removal can be used interchangeably within the scope of this disclosure. Therefore, precision machining does not infer that a machine must make contact with heat exchanger core 40 during the precision machining process. Following the brazing of a heat exchanger core 40, precision material removal is performed to remove material from the faces of heat exchanger core 40, thereby creating heat exchanger core 40' as depicted in FIG. 3.

Figure 4:
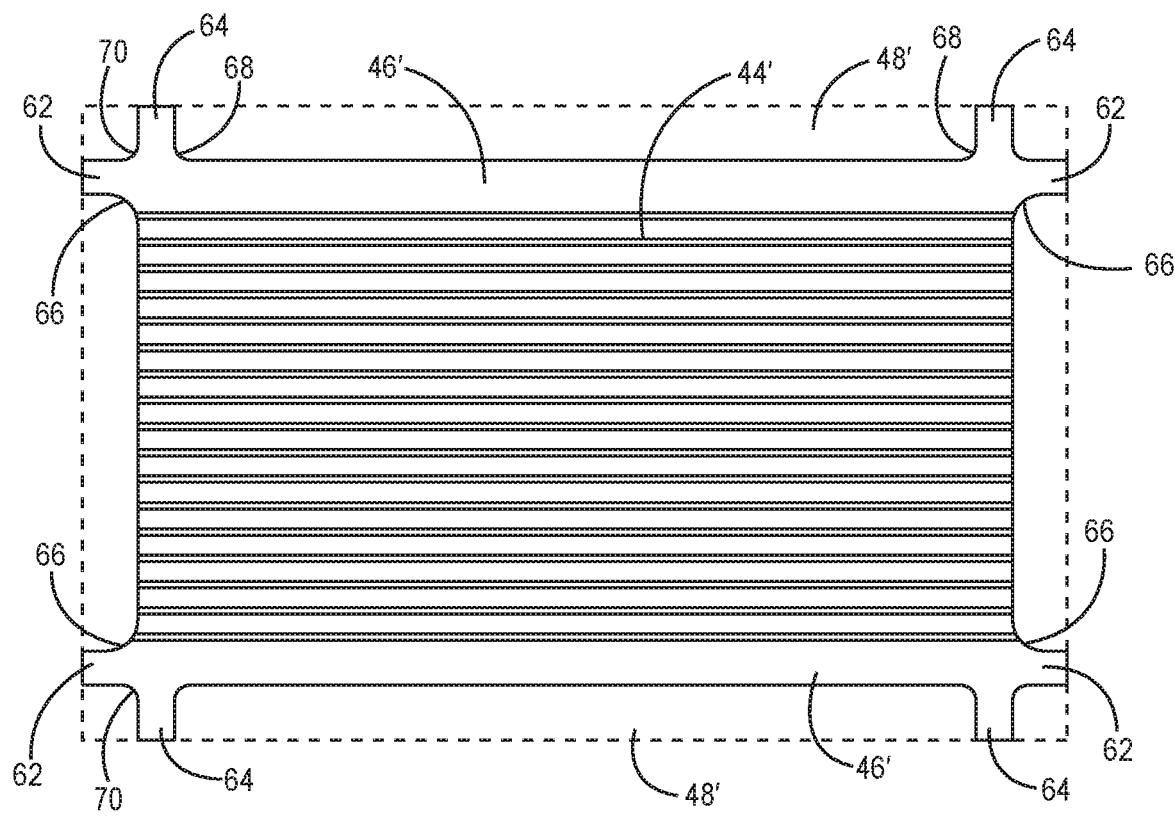
FIG. 4 is a top view of a layer of the heat exchanger core depicting the precision machining material removal regions.

FIG. 4 is a top view of hot layer 47 of heat exchanger core 40' following precision material removal, with the phantom lines showing the outline prior to precision material removal. It is to be appreciated that FIG. 4 is a conceptualized illustration, because heat exchanger core 40 would include top end sheet 54 prior to the precision material removal operation. Shown in FIG. 4 are hot fin 44', hot closure bars 46', parting sheet 48', cold closure bars 52', hot core bands 62, cold core bands 64, hot core band radii 66, cold core band radii 68, and core band corner radii 70. Hot layer 47 includes hot fin 44' and two hot closure bars 46', one on either side of hot fin 44'. As noted above with respect to FIG. 3, heat exchanger core 40 is formed by brazing prior to a precision material removal process being performed. Material is removed from the outer sides and outer corners of hot closure bars 46, thereby creating hot closure bars 46' (shown in FIG. 4), which have several prominent features that will be described. Hot core bands 62 are created near the open ends of hot layer 47, where hot fin 44' is exposed to the hot flow. Hot core bands 62 can be used for the subsequent welding of the hot manifolds (not shown), thereby moving the welding heat-affected zones away from heat exchanger core 40'. In the illustrated embodiment, the inside corners of hot core bands 62 have hot core band radii 66 which can reduce internal material stresses in hot closure bar 46' as compared to that of a square corner, thereby improving the robustness of heat exchanger core 40'. Core band corner radii 70 can further reduce internal material stresses in hot closure bar 46' as compared to that of a square corner, thereby also improving the robustness of heat exchanger core 40'.

Similarly, material is removed from the outer sides and outer corners of cold closure bars 52, which have several similar prominent features. Cold core bands 64 are created near the open ends of cold layer 53, where the cold fins 50 are exposed to the cold flow. Cold core bands 64 can be used for the subsequent welding of the cold manifolds (not shown), thereby moving the welding heat-affected zones away from heat exchanger core 40'. In the illustrated embodiment, the inside corners of cold core bands 64 have cold core band radii 68 which can reduce internal material stresses in cold closure bars 52 over that of a square corner, thereby improving the robustness of heat exchanger core 40'. Similarly, core band corner radii 70 can further reduce internal material stresses in the cold closure bar over that of a square corner, thereby also improving the robustness of heat exchanger core 40'. In the embodiment shown in FIG. 4, hot fin 44' extends to the ends of hot layer 47, thereby vertically over-lying the cold closure bars. Accordingly, during the precision material removal process for removing the outer edges of the cold closure bars, the end regions of hot fin 44' are removed as depicted in FIG. 4. Similarly, during the precision material removal process for removing the outer edges of hot closure bars 46, the end regions of cold fins 50 are removed.

EDM is used as the precision machining process in the illustrated embodiment. Those who are skilled in the precision machining arts are familiar with EDM, with two types of EDM generally being used. Moving wire EDM can be used, with the moving wire generally being perpendicular to the hot layer shown in FIG. 4. However, other moving wire orientations are within the scope of the present disclosure.

In another embodiment, plunge EDM can be used, thereby offering multiple possible EDM plunge axes. In one of the other embodiments, the EDM plunge axis can be approximately perpendicular to the hot layer shown in FIG. 4, thereby producing substantially the same result as that described above regarding moving wire EDM. In another embodiment the EDM plunge axis can be approximately parallel to the respective hot and cold layers. For example, in this other embodiment, material could be removed from the hot inlet and outlet regions of heat exchanger core 40 by driving the plunge EDM tool into the ends of heat exchanger core 40 into (or against) the directions of hot flow. In this other embodiment, the EDM plunge tool (not shown) can have a fillet radius on the leading corners of the plunge end, thereby creating the desired hot core band radii 66 and cold core band radii 68. In some of these other embodiments, the EDM plunge tool can have one fillet radius on opposite leading corners corresponding to hot core band radii 66 and cold core band radii 68, and a different fillet radius on the two other opposite leading corners corresponding to the bottom end sheet (not shown) and the top end sheet (not shown). Plunge EDM will be described in more detail in FIG. 6.

In the embodiment described above with respect to FIG. 4, EDM was used for the precision machining process to produce heat exchanger core 40'. As noted above in regard to FIG. 3, other forms of precision material removal (i.e., precision machining) are within the scope of the present disclosure, with non-limiting examples including laser cutting, band sawing, hogging, acid etching, and ion milling, alone or in any combination.

Figure 5:
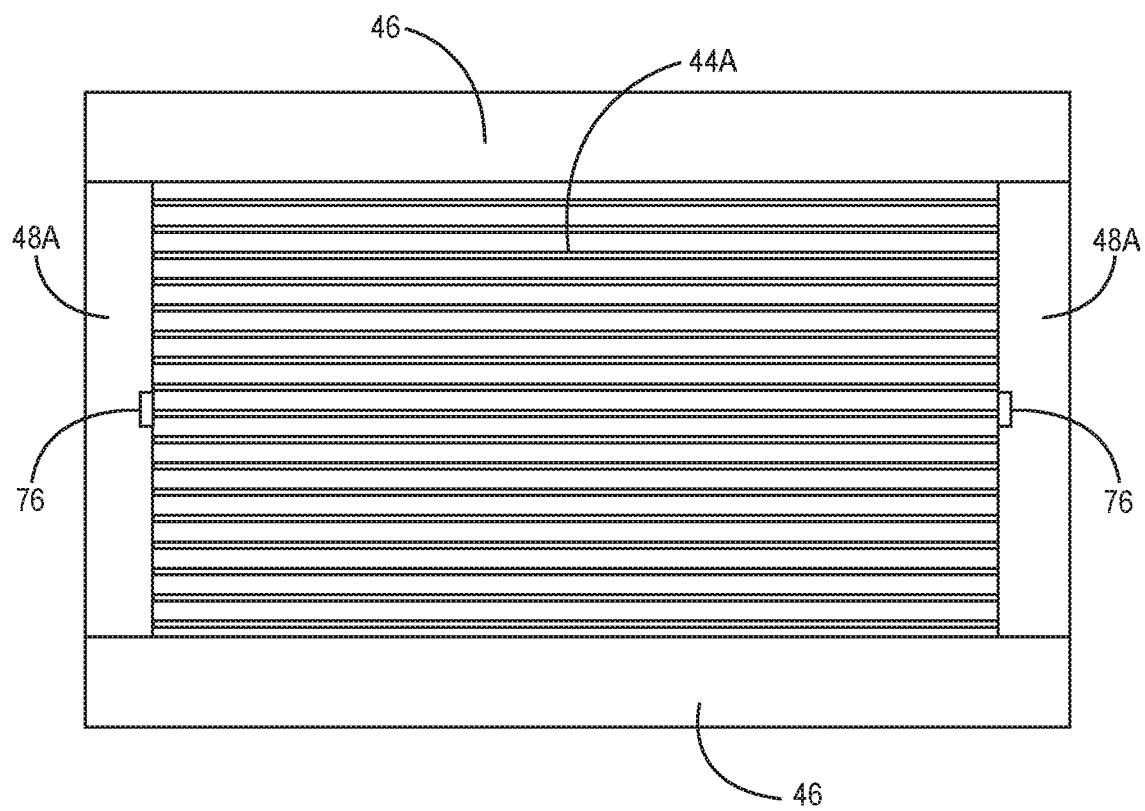
FIG. 5 is a top view of a second embodiment of a layer of the heat exchanger core.

FIG. 5 is a top view of a second embodiment of a hot layer of heat exchanger core 40. Shown in FIG. 5 are hot fin 44A, hot closure bars 46, parting sheet 48A, and parting sheet tabs 76. FIG. 5 depicts an exemplary hot layer that can exist during the stacking of heat exchanger core components, prior to being capped with a top end sheet (not shown) to construct a heat exchanger core. The descriptions of the elements shown in FIG. 5 are substantially similar to those shown in FIG. 4 with the exception that hot fin 44A does not fully extend to the opposite ends of the hot layer. Instead, parting sheet 48A includes parting sheet tabs 76 near the ends, as shown. In the illustrated embodiment, parting sheet tabs 76 are lanced tabs, being cut and pushed upward away from the underlying cold closure bars (not shown). Parting sheet tabs 76 provide lateral fixation of hot fin 44A, preventing movement in the directions parallel to hot closure bars 46 (that is, toward either end of the hot layer, toward either cold closure bar). In the illustrated embodiment, parting sheet tabs 76 are aligned vertically over the underlying cold closure bars (not shown).

The second embodiment of the hot layer of heat exchanger core 40 shown in FIG. 5 can have several benefits. For example, parting sheet tabs 76 can require that a lesser amount of material to be used for hot fins 44A, and accordingly, require less material removal during the subsequent precision material removal process. In the illustrated embodiment, the outer ends of parting sheet 48A up to and including parting sheet tabs 76 can be removed by precision machining. In other embodiments, greater or lesser amounts of parting sheet 48A can be removed. In some embodiments, a different number of parting sheet tabs 76, or a different style of parting sheet tabs 76, can be used. In a particular embodiment, parting sheet tabs 76 can be bent tabs.

Referring again to FIG. 5, only one exemplary hot layer of heat exchanger core 40 is shown. The cold layers of heat exchanger core 40 can have a similar structure to that shown in FIG. 5, whereby parting sheet tabs (not shown) on parting sheets (not shown) that are immediately below cold fins (not shown) can be used to provide lateral fixation of the cold fins in a similar fashion to that shown on the hot layers.

Figure 6:
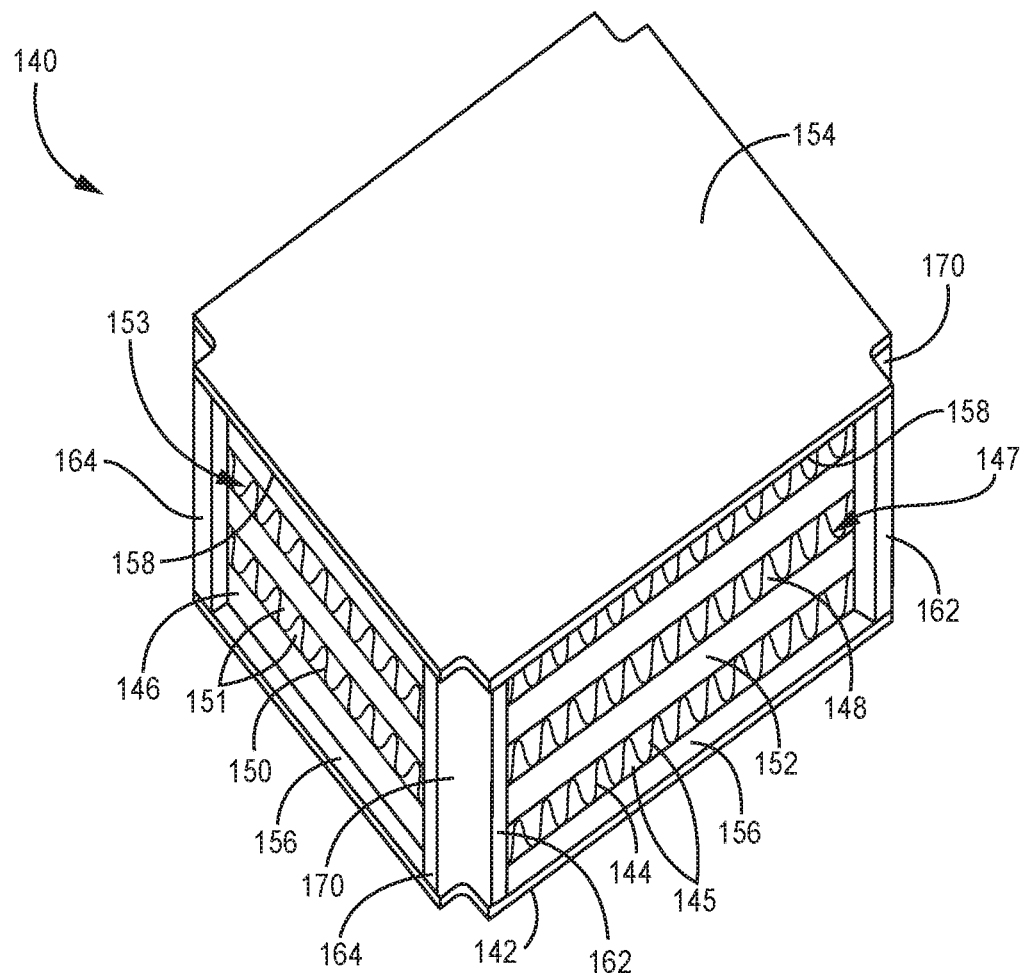
FIG. 6 is a perspective view of a second embodiment of the heat exchanger core following precision material removal.

FIG. 6 is a perspective view of a second embodiment of heat exchanger core 140 following precision material removal by plunge EDM. Shown in FIG. 6 are bottom end sheet 142, hot fins 144, hot channels 145, hot closure bars 146, hot layers 147, parting sheets 148, cold fins 150, cold channels 151, cold closure bars 152, cold layers 153, top end sheet 154, hot core bands 162, cold core bands 164, hot core band radii 166, cold core band radii 168, and core band corner radii 170. The element numbers in FIG. 6 are not denoted with prime marks (as were used in FIGS. 3-4), because heat exchanger core 140 is only illustrated in the configuration following precision material removal. The description of the aforementioned elements is substantially similar to that provided for the first embodiment shown in FIGS. 3-4. Additionally shown in FIG. 6 are bottom overhang 156 and top overhang 158. In the embodiment shown in FIG. 6, precision material removal from the faces of heat exchanger core 140 is by plunge EDM with the plunge axis being approximately perpendicular to each face of heat exchanger core 140. The size of the EDM plunge tool (not shown), including the corner radii on the plunge tool (not shown) can be selected to establish the desired features of hot core bands 162, cold core bands 164, hot core band radii 166, cold core band radii 168, and core band corner radii 170. In the illustrated embodiment, the size of the EDM plunge tool is selected to remove material from the four vertical faces of heat exchanger core 140 while leaving in place at least a portion of bottom end sheet 142 and top end sheet 154, thereby creating bottom overhang 156 and top overhang 158, respectively.

As described earlier with regard to FIG. 3, heat exchanger core 140 is configured to accommodate the metallurgical joining of hot and cold manifolds (not shown). Specifically, with regard to FIG. 6, a hot manifold can be welded to hot core bands 162 and the associated bottom overhang 156 and top overhang 158 on each respective face. Similarly, cold manifolds can be welded to cold core bands 164 and the associated bottom overhang 156 and top overhang 158 on each respective face. Just as hot core bands 162 and cold core bands 164 move the welding heat-affected zones away from heat exchanger core 140, bottom overhang 156 and top overhang 158 also move the welding heat-affected zones away from heat exchanger core 140. Accordingly, bottom overhang 156 and top overhang 158 can further improve the robustness of heat exchanger core 140. This in turn can improve the manufacturability of heat exchanger core 140 while providing a more robust design that can be less susceptible to manufacturing damage. The more robust heat exchanger core 140 can therefore have a reduced incidence of defects that occur during manufacturing, which can help lower manufacturing cost by reducing re-work. The more robust design can also reduce latent damage from the weld heat-affected zones, thereby making heat exchanger core 140 more resilient to thermal and pressure cycles that can occur during lifetime operation. This can extend the life cycle of a heat exchanger containing heat exchanger core 140, thereby improving service life and reducing the cost of maintenance.

In some embodiments, the size of the EDM plunge tool can be selected to provide bottom overhang 156 and/or top overhang 158 on only some of the vertical faces of heat exchanger 140. In other embodiments, bottom overhang 156 and/or top overhang 158 can be used only where some of the inlet and/or outlet manifolds will be attached to heat exchanger core 140. For example, in a particular embodiment, heat exchanger core 140 can have only bottom overhang 156, or only top overhang 158, on any particular face. It is to be appreciated that the aforementioned benefits also attach to the embodiment of heat exchanger core 40' as shown in FIG. 3, in which bottom and top overhangs were not depicted.

Referring above to the various embodiments of heat exchanger core 40' and 140, hot core band radii 66, 166, cold core band radii 68, 168, and core band corner radii 70, 170 together better distribute the structural loads on heat exchanger core 40', 140. This in turn can lower the internal material stress values as compared to square corners. As noted above, the hot and cold manifold welds are moved away from the relatively thin internal components of heat exchanger core 40', 140. Therefore, hot core band radii 66, 166, cold core band radii 68, 168, and core band corner radii 70, 170 result in a more robust design that can have a reduced incidence of material failure from repeated thermal and pressure cycles that can occur during lifetime operation. This can additionally extend the life cycle of a heat exchanger containing heat exchanger core 40', 140, thereby improving service life and reducing the cost of maintenance.

In a particular embodiment, a heat exchanger that includes heat exchanger core 40', 140 can be configured to be used on an aircraft. In another embodiment, a heat exchanger that includes heat exchanger core 40', 140 can be configured to be used in any setting, with non-limiting examples including ships, land vehicles, machines, factories, processing plants, and other buildings. As noted earlier with regard to FIG. 1, the resulting heat exchanger can be mounted in any orientation, thereby not maintaining the orientation of bottom and top as used in this disclosure.

Discussion of Possible Embodiments

The following are non-exclusive descriptions of possible embodiments of the present invention.

A method for producing a heat exchanger core defining a plurality of exterior faces and an interior region, comprising the steps of: stacking a bottom end sheet, a plurality of alternately stacked individual hot and cold layers, and a top end sheet, each of the individual hot and cold layers including: a fin element forming a plurality of parallel open-ended channels adapted to pass a fluid therethrough; a parting sheet separating the individual hot and cold layers from the next individual hot and cold layers; and two closure bars positioned on opposite sides of the fin element, parallel to the open-ended channels and extending a length of the open-ended channels; wherein: each closure bar has an original closure bar width and a closure bar height, the original closure bar width at least as great as the closure bar height; each closure bar defines an inner face and an outer face, the inner face directed toward the fin element and the outer face directed away from the fin element; the open-ended channels of the individual hot layers are parallel to each other; and the open-ended channels of the individual cold layers are parallel to each other; brazing the bottom end sheet, the plurality of alternately stacked individual hot and cold layers, and the top end sheet in a brazing furnace; and removing material from each of the plurality of exterior faces by precision machining, thereby removing material from each closure bar outer face to produce a final closure bar width.

The method of the preceding paragraph can optionally include, additionally and/or alternatively, any one or more of the following features, configurations and/or additional components:

A further embodiment of the foregoing method, wherein the precision machining comprises one or more of moving wire electrical discharge machining (EDM) and plunge EDM.

A further embodiment of the foregoing method, wherein the precision machining comprises one or more of laser cutting, band sawing, hogging, acid etching, and ion milling.

A further embodiment of the foregoing method, wherein the plate-fin heat exchanger core comprises one or more of nickel, aluminum, titanium, copper, iron, cobalt, and alloys thereof.

A further embodiment of the foregoing method, wherein: each individual hot layer comprises two hot closure bars, each defining a hot closure height between 0.025-2 in. (0.64-50.8 mm) and a hot closure bar original width; and each individual cold layer comprises two cold closure bars, each defining a cold closure height between 0.025-2 in. (0.64-50.8 mm) and a cold closure bar original width.

A further embodiment of the foregoing method, wherein the precision machining produces two vertical core bands on each closure bar outer face, each configured to be joined to a manifold by welding, thereby forming a plurality of welding heat-affected zones that are isolated from the interior region.

A further embodiment of the foregoing method, wherein the precision machining produces a plurality of core band radii, each configured to distribute structural loads on the heat exchanger core.

A further embodiment of the foregoing method, wherein: the heat exchanger core defines four vertical corners; and the precision machining process removes material from each of the four vertical corners, further defining the two vertical core bands on each face.

A further embodiment of the foregoing method, wherein the precision machining produces a plurality of core band corner radii, each configured to distribute structural loads on the heat exchanger core.

A further embodiment of the foregoing method, wherein: the precision machining comprises plunge EDM, the plunge EDM comprising a plunge EDM tool; the plunge EDM tool is configured to be driven into at least one of the front, back, left side, and right side; the plunge EDM tool further defines a plurality of leading corners, each of the plurality of leading corners defining a fillet radius; and the fillet radii are configured to produce a plurality of core band radii, each configured to distribute structural loads on the heat exchanger core.

A further embodiment of the foregoing method, wherein plate-fin heat exchanger comprises a heat exchanger core produced by the foregoing method.

A further embodiment of the foregoing method, wherein an aircraft comprises the plate-fin heat exchanger produced by the foregoing method.

A heat exchanger core defining a plurality of exterior faces and an interior region, comprising: a bottom end sheet; a plurality of alternately stacked individual hot and cold layers; and a top end sheet; wherein: each individual hot and cold layer includes: a fin element forming a plurality of parallel open-ended channels adapted to pass a fluid therethrough; a parting sheet separating each individual hot or cold layer from the next individual hot or cold layer; and two closure bars positioned on opposite sides of the fin element, the inner face directed toward the fin element and the outer face directed away from the fin element, parallel to the open-ended channels and extending the length of the open-ended channels; each closure bar has two vertical core band sections on each outer face defining an original closure bar width, the original closure bar width greater than the closure bar height; and each closure bar defines an inner face and an outer face, the inner face directed toward the fin element and the outer face distal from the inner face.

The heat exchanger core of the preceding paragraph can optionally include, additionally and/or alternatively, any one or more of the following features, configurations and/or additional components:

A further embodiment of the foregoing heat exchanger core, comprising one or more of nickel, aluminum, titanium, copper, iron, cobalt, and alloys thereof.

A further embodiment of the foregoing heat exchanger core, wherein: each individual hot layer comprises two hot closure bars, each defining a hot closure height between 0.025-2 in. (0.64-50.8 mm) and a hot closure bar original width; and each individual cold layer comprises two cold closure bars, each defining a cold closure height between 0.025-2 in. (0.64-50.8 mm) and a cold closure bar original width.

A further embodiment of the foregoing heat exchanger core, wherein the vertical core band sections define two vertical core bands on each outer face, each configured to be joined to a manifold by welding, thereby forming a plurality of welding heat-affected zones that are isolated from the interior region.

A further embodiment of the foregoing heat exchanger core, wherein each of the two vertical core bands further define a plurality of core band radii, each configured to distribute structural loads on the heat exchanger core.

A further embodiment of the foregoing heat exchanger core, wherein: the heat exchanger core defines four vertical corners; and each of the four vertical corners further defines two vertical core bands on each face.

A further embodiment of the foregoing heat exchanger core, wherein each of the two vertical core bands further define a plurality of core band corner radii, each configured to distribute structural loads on the heat exchanger core.

A further embodiment of the foregoing heat exchanger core, further comprising a plate-fin heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for producing a heat exchanger core defining a plurality of exterior faces and an interior region, comprising the steps of:
    stacking a bottom end sheet, a plurality of alternately stacked individual hot and cold layers, and a top end sheet, each of the individual hot and cold layers including:
        a fin element forming a plurality of parallel open-ended channels adapted to pass a fluid therethrough;
        a parting sheet separating the individual hot and cold layers from the next individual hot and cold layers; and
        two closure bars positioned on opposite sides of the fin element, parallel to the open-ended channels and extending a length of the open-ended channels;
    wherein:
        each closure bar has an original closure bar width and a closure bar height, the original closure bar width at least as great as the closure bar height;
        each closure bar defines an inner face and an outer face, the inner face directed toward the fin element and the outer face directed away from the fin element;
        the open-ended channels of the individual hot layers are parallel to each other; and
        the open-ended channels of the individual cold layers are parallel to each other;

brazing the bottom end sheet, the plurality of alternately stacked individual hot and cold layers, and the top end sheet in a brazing furnace; and removing material from each of the plurality of exterior faces by precision machining, thereby removing material from each closure bar outer face to produce a final closure bar width;

wherein the precision machining produces two vertical core bands on each closure bar outer face, each configured to be joined to a manifold by welding, thereby forming a plurality of welding heat-affected zones that are isolated from the interior region.

2. The method of claim 1, wherein the precision machining comprises one or more of moving wire electrical discharge machining (EDM) and plunge EDM.

3. The method of claim 1, wherein the precision machining comprises one or more of laser cutting, band sawing, hogging, acid etching, and ion milling.

4. The method of claim 1, wherein the plate-fin heat exchanger core comprises one or more of nickel, aluminum, titanium, copper, iron, cobalt, and alloys thereof.

5. The method of claim 1, wherein:

each individual hot layer comprises two hot closure bars, each defining a hot closure height between 0.025-2 in. (0.64-50.8 mm) and a hot closure bar original width; and each individual cold layer comprises two cold closure bars, each defining a cold closure height between 0.025-2 in. (0.64-50.8 mm) and a cold closure bar original width.

6. The method of claim 1, wherein the precision machining produces a plurality of core band radii, each configured to distribute structural loads on the heat exchanger core.

7. The method of claim 1, wherein:

the heat exchanger core defines four vertical corners; and the precision machining process removes material from each of the four vertical corners, further defining the two vertical core bands on each face.

8. The method of claim 7, wherein the precision machining produces a plurality of core band corner radii, each configured to distribute structural loads on the heat exchanger core.

9. The method of claim 1, wherein:

the precision machining comprises plunge EDM, the plunge EDM comprising a plunge EDM tool;

the plunge EDM tool is configured to be driven into at least one of the front, back, left side, and right side;

the plunge EDM tool further defines a plurality of leading corners, each of the plurality of leading corners defining a fillet radius; and the fillet radii are configured to produce a plurality of core band radii, each configured to distribute structural loads on the heat exchanger core.

10. A plate-fin heat exchanger comprising a heat exchanger core produced by the method of claim 1.

11. An aircraft comprising the plate-fin heat exchanger of claim 10.

* * * * *